June 30, 1931. W. N. BOOTH 1,812,032
MACHINE FOR RIVETING SPOKES OF VEHICLE WIRE WHEELS
Filed July 18, 1927 3 Sheets-Sheet 2

Inventor
William N. Booth
By Whittemore Hulbert
Whittemore Belknap
Attorneys

Patented June 30, 1931

1,812,032

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

MACHINE FOR RIVETING SPOKES OF VEHICLE WIRE WHEELS

Application filed July 18, 1927. Serial No. 206,757.

The invention relates to a riveting machine for vehicle wire wheels and refers more particularly to a machine for riveting the spokes of vehicle wire wheels of that type having a hub shell and a rim. The invention has for one of its objects the provision of a machine which holds the hub shell and rim concentric while the spokes are being riveted. Another object is to construct the machine so that it holds the spokes in place while they are being riveted. A further object is to so construct the machine that the wheel assembly is automatically indexed to successively advance its corresponding spokes to a position to be riveted. With these as well as other objects in view, the invention resides in the novel features of construction and combinations and arrangements of parts as more fully hereinafter set forth.

In the drawings:—

Figure 4 is a cross section on the line 4—4 of Figure 3;

Figure 5 is a rear elevation thereof, partly broken away and partly in section.

Figure 1:
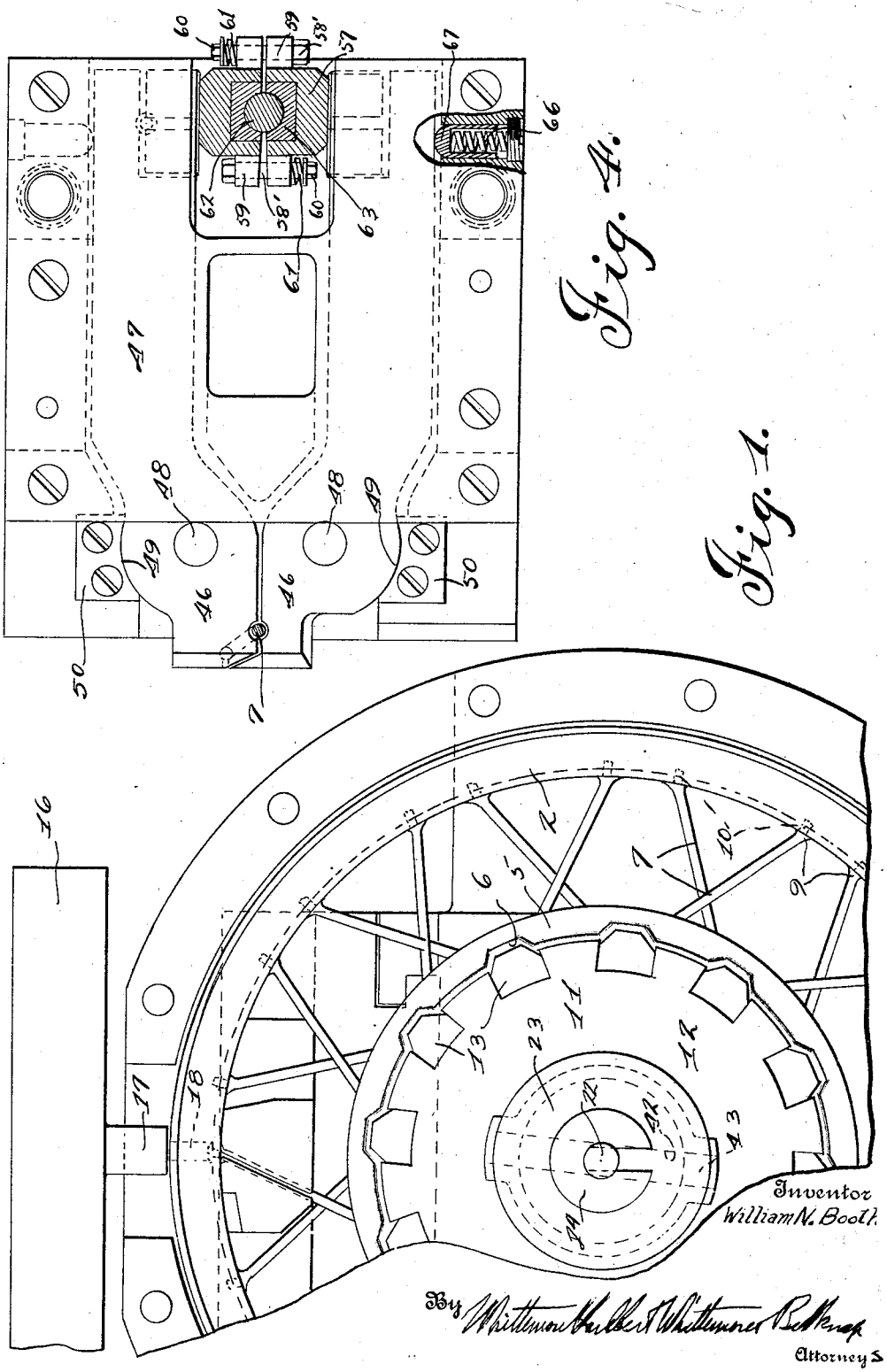
Figure 1 is a front elevation of a machine embodying my invention.
Figure 2:
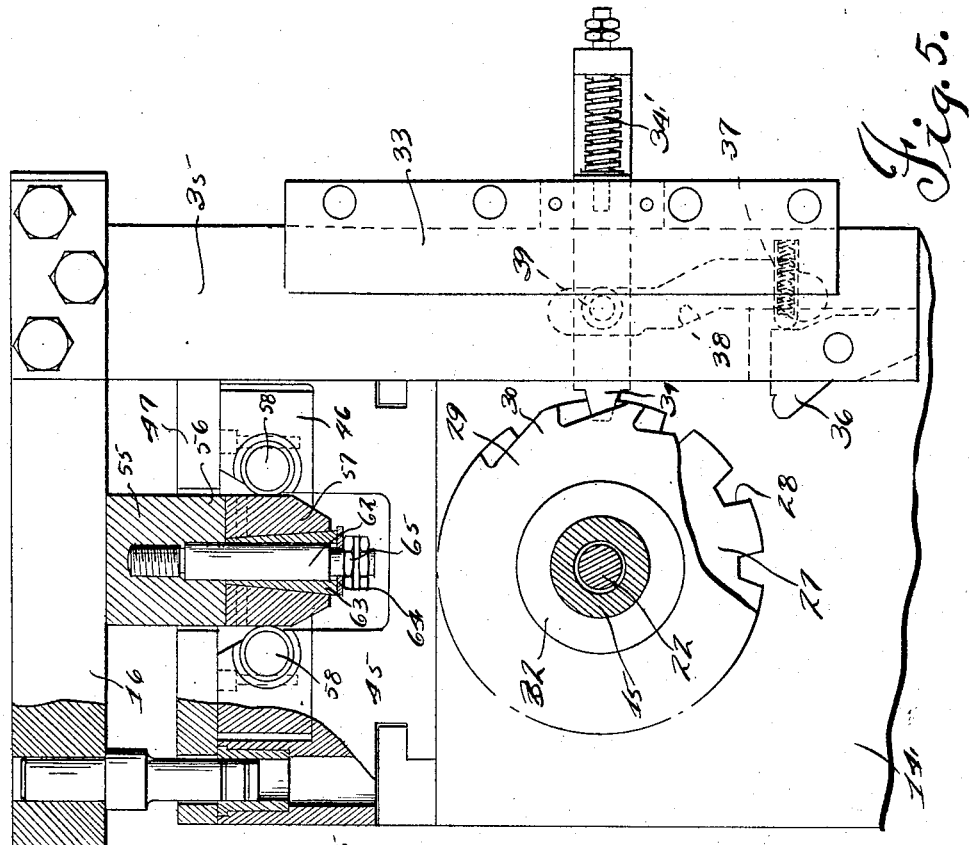
Figure 2 is a plan view thereof.
Figure 3:
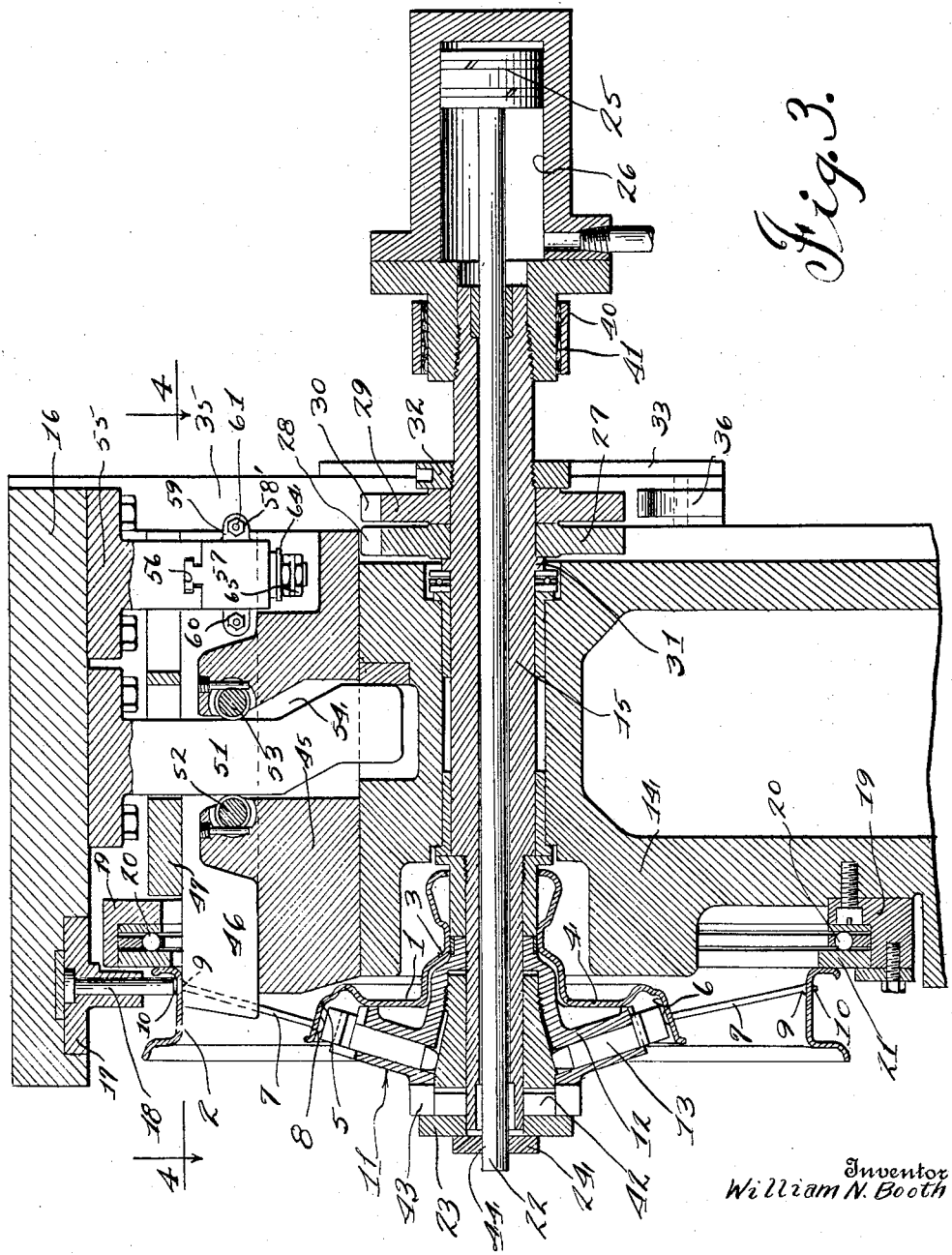
Figure 3 is a cross section on the line 3—3 of Figure 1.

The riveting machine, in general, is designed to rivet the outer ends of wire spokes of a vehicle wire wheel, which in the present instance has the sheet metal hub shell 1 and the rim 2. The hub shell has the barrel section 3 and the flange section 4, the latter terminating at its outer edge in the rearwardly extending annular flange 5, which is provided with the series of angularly spaced transverse bosses 6. The rim 2 is specifically a sheet metal channel-shaped felly. In the completed wire wheel, front and rear spokes connect the hub shell and rim, the front spokes extending from the rear edge of the base of the felly to the front end of the barrel section 3 and the rear spokes extending from the front edge of the base of the felly to the annular flange 5. These rear spokes are arranged in pairs with the spokes of each pair extending transversely from the adjacent side walls of the adjacent bosses 6 to the rim and crossing intermediate their ends.

The riveting machine illustrated in the drawings operates upon the rear spokes 7, which as shown have the hemi-spherical heads 8 at their inner ends for engaging hemi-spherical sheets in the side walls of the bosses 6, and the enlargements 9 and the tenons 10 at their outer ends, the tenons having their axes inclined to the axes of the spokes to extend radially through the base of the rim 1 and the enlargements forming annular shoulders surrounding the tenons for engaging the base of the rim. The hemi-spherical shoulders formed by the heads and the shoulders formed by the enlargements are at fixed distances apart so that when they engage the hub shell and rim respectively they assure concentricity of the same. The rear spokes are assembled with the hub shell and rim to form a wheel assembly prior to this wheel assembly being inserted in the riveting machine. In detail, the rear spokes are passed outwardly through the side walls of the bosses 6 and their tenons are properly engaged with the rim 2. Then the rear section 11 of a chuck is inserted into the hub shell from its rear end and its body 12 suitably clamped to the hub shell, after which its plungers 13 are forced outwardly into contact with the heads 8 of the rear spokes to clamp the hemi-spherical shoulders formed by these heads firmly against their seats.

14 is the base of the riveting machine in which is journaled the horizontal shaft 15, which extends through both the front and rear sides of the base and has the wheel assembly mounted upon its front end. 16 is a vertically reciprocable holder above the base 14 and adapted to be carried by a vertically reciprocable ram. This holder has secured to its lower face near its front edge the punch block 17, which secures the riveting punch 18 to the holder. 19 is a thrust ring holder which is secured to the front side of the base 14 and carries the anti-friction bearing 20, the front race 21 of which forms an abutment for the front flange of the rim 2 and positions this rim so that the tenons 10 of the rear spokes may register with the punch 18, which is adapted to first split the outer ends of these tenons and then head the same over against the outer face of the base of the rim.

For the purpose of clamping the shoulders formed by the spoke enlargements 9 against the inner face of the base of the rim prior to the riveting operation, the chuck section 11 with the hub shell 1 is moved rearwardly by means of the draw bar 22, which extends axially through the shaft 15 and is adapted to actuate the chuck section through the collar 23 and the washer 24, the latter having bifurcations engageable in grooves extending transversely at opposite sides of the draw bar. The rear end of the draw bar is connected to the piston 25 within the cylinder 26 and a suitable medium such as compressed air may be used for moving this piston within the cylinder.

For the purpose of indexing the wheel assembly to successively advance corresponding spokes to a position registering with the riveting punch 18, I have provided mechanism which is actuated upon the reciprocation of the holder 16. In detail, 27 is an index disk having the notches 28 in its periphery, the notches being equidistant and their number corresponding to the number of correspondingly inclined rear spokes. These notches have inwardly converging sides. 29 is a ratchet disk having a like number of the teeth 30 at its periphery providing contact shoulders facing in a clockwise direction. These two disks are secured upon the shaft 15 at the rear of the base 14 between the annular collar 31, preferably formed integral with the shaft, and the nut 32 threaded upon the shaft. Furthermore, the two disks are secured to the shaft to rotate the same, they having in the present instance polygonal apertures for engaging a polygonal portion of the shaft. 33 is a gib secured to the rear of the base 14 and having mounted thereon the longitudinally reciprocable plunger 34 which extends transversely of the gib and has a tapered nose engageable in the notches 28 of the index disk 27, the sides of the nose preferably having the same inclination as the sides of the notches so that when the plunger engages in a notch the index disk will be exactly positioned. This plunger is preferably forced toward the index disk by the coil spring 34′. 35 is a slide secured to the holder 16 and engaging the gib 33 and 36 is a dog pivotally mounted upon the slide and having a nose at its upper end which is yieldably held in position to engage the contact shoulder of a tooth 30 of the ratchet disk 29. As shown, this nose is held in this position by means of the coil spring 37. For reciprocating the plunger 34 to release the index disk, allow approximate indexing thereof and then exactly index the same, the slide 35 is provided with the cam groove 38 and the plunger 34 is provided with the transverse projection 39 in the nature of a pin engaging in this groove. The groove has vertically extending aligned end portions and an intermediate curved portion for compelling the reciprocation of the plunger.

As shown in Figure 5, the holder 16 is in its lowermost position, at which time the riveting punch 18 operates upon the outer end of the tenon of one of the rear spokes of the wheel assembly. At this time the plunger 34 engages one of the notches 28 of the index disk and holds the latter stationary, the plunger having been forced inwardly by the coil spring 34′ and its projection or pin 39 engaging in the upper end portion of the cam groove 38. Upon upward movement of the holder 16, the intermediate curved portion of the cam groove carries the plunger outwardly to release the index disk, after which the dog 36 engages the shoulder of a tooth 30 of the ratchet disk and rotates the same to approximately the next position of angular adjustment. Then the lower portion of the cam groove allows the plunger 34 to move into engagement with the succeeding notch of the index disk under the action of the coil spring 34′ to positively position the index disk. While the holder 16 is moving downwardly, the plunger 34 is temporarily disengaged from its notch in the index disk by reason of the intermediate curved portion of the groove, but the shaft 15 is held from rotation at this time by means of the friction brake 40, which encircles and is held in resilient contact with the flanged collar 41 fixedly secured upon the rear end of the shaft and upon which the cylinder 26 is mounted. The shaft 15 rotates the chuck section 11 and consequently the wheel assembly through the collar 23, which has in its rear face the aligned radial grooves 42 in which the projections 43 of the chuck section engage, this collar being non-rotatably held upon the front end of the shaft by reason of the shaft having the flat portions 44 at opposite sides and the collar having an aperture therethrough which is correspondingly shaped.

For the purpose of preventing bending of the spokes while they are being riveted and at the same time holding the shoulders formed by the enlargements 9 against the inner face of the base of the rim during this riveting, I have provided the die shoe 45, which is slidably mounted upon the base 14 above the shaft 15 and clears the index disk and ratchet disks. This die shoe is reciprocable toward and away from the rear spokes of the wheel assembly and carries the pair of horizontal spoke gripping jaws 46 having cooperating front ends inclined and also shaped to engage the portions of corresponding spokes, including their enlargements 9, for a substantial length inwardly from the base of the rim. 47 is a cover plate above the jaws and secured to the die shoe. The jaws are pivotally connected to the die shoe by the pins 48 near the front ends of the jaws and to relieve these pins from shearing stress, the portions of the jaws opposite the pins are curved at 49 concentric with the axes of the pins and their curved faces are engageable with the bearing blocks 50 secured to the die shoe. For reciprocating the die shoe to carry the spoke gripping jaws forwardly to a position to engage a spoke and rearwardly to a position to clear the spokes to permit indexing of the wheel assembly, there is the cam 51 secured to and depending from the holder 16 and engageable with the rolls 52 and 53 mounted at the front and rear of the opening 54 through the die shoe, this opening permitting the passage of the cam therethrough. The cover plate is also apertured for the passage of the cam therethrough.

For the purpose of swinging the spoke gripping jaws to clamp a spoke, there is the cam holder 55 which is secured to and depends from the holder 16 in rear of the cam 51 and through the cover plate 47. This cam holder has in its lower end the diametrically extending T-shaped slot 56 for carrying the pair of cams 57 having their opposite sides engageable with the rolls 58 upon the jaws 46, which latter extend longitudinally thereof along their inner sides at their rear ends. These two cams are yieldably held together by means of the bolts 58' extending through the flanges 59 upon the cams, the nuts 60 threaded upon the bolts and the coil springs 61 between the nuts and the adjacent flanges. 62 is a bolt threaded axially into the lower end of the cam holder 55 and 63 are wedges encircling the bolt and engaging in grooves extending longitudinally or vertically in the inner portions of the cams, there being a wedge for each cam. 64 is a washer for abutting the lower ends of the wedges and 65 is a nut threaded upon the bolt and contacting with the washer for moving the same longitudinally of the bolt and thereby correspondingly moving the wedges to vary the distance between the cams and thereby assure tight gripping of the spokes by the jaws 46. To secure an extended contact between the cam faces of the cams and the rolls 58 at all times, the clearance between the inner flanges 59 of the cams and the inner portions of the wedges progressively increases away from the bolt 62 so that the cams with their respective wedges may swing about the bolt upon swinging of the spoke gripping jaws. For normally maintaining the spoke gripping jaws in open position, there are the coil springs 66 which yieldably force the plungers 67 transversely of the die shoe 45 and against the outer sides of the spoke gripping jaws near their rear ends.

With the machine as above described and with the holder 16 in raised position, at which time the plunger 34 engages a notch 28 of the index disk 27, a wheel assembly including the hub shell 1, the rim 2 and the rear spokes 7 with the chuck section 11 secured thereto may be sleeved over the shaft 15. The collar 23 may then be sleeved over the shaft and the chuck section and consequently the wheel assembly angularly positioned by engaging the projections 43 upon the chuck section in the grooves 42 of the collar, the angular position of the latter relative to the shaft being predetermined by reason of the flat faces 44 upon the shaft. The washer 24 may then be engaged over the pull bar 22 and compressed air admitted into the cylinder 26 to move the piston 25 rearwardly, which moves the chuck section and hub shell rearwardly and relative to the rim, the latter abutting the thrust washer 21. This relative axial movement of the hub shell and rim forces the shoulders formed by the enlargements 9 of the rear spokes firmly against the inner face of the base of the rim. The ram carrying the holder 16 may then be lowered and during the first portion of the lowering movement the cam 51 moves the die shoe 45 forwardly and with the die shoe the spoke gripping jaws 46. Then the next portion of the lowering movement brings the cams 57 into wedging engagement with the rolls 58 upon the spoke gripping jaws spreading the rear ends of these jaws and clamping their front ends around a spoke, including its enlargement, after which the riveting punch 18 is lowered to rivet over the outer end of the tenon of the spoke against the outer face of the base of the rim. After the spoke has been riveted, the ram and holder 16 are raised during the first portion of which the cams 57 are carried upwardly out of engagement with the rolls 58 to release the spoke gripping jaws 46, which are then swung to open position by the coil springs 66 and plungers 67. Then the die shoe 45 carrying with it the spoke gripping jaws is moved rearwardly by the cam 51 acting through the roller 53 to move the spoke gripping jaws out of the path of the spokes. At this time the plunger 34 may be moved away from the index disk 27 and out of engagement with its notch by the operation of the cam groove 38 engaging the projection or pin 39 upon the plunger. Upon continued upward movement and while the plunger 34 is still held out of engagement with the index disk, the dog 36 engages the shoulder formed by a tooth 30 upon the ratchet disk 29 and rotates this disk, the index disk, the shaft 15 and consequently the wheel assembly to bring the succeeding spoke correspondingly inclined to the first spoke operated upon into approximate position to be riveted. Then during the final portion of the upward movement, the plunger 34 is again carried inwardly to engage the succeeding notch in the index disk to exactly position this disk and through it and the intermediate parts the wheel assembly to exactly position the next spoke to be operated upon in alignment with the riveting punch.

After the corresponding spokes or those correspondingly inclined have been riveted, the wheel assembly may then be riveted.

What I claim as my invention is:

1. In a riveting machine for wire wheels, the combination with a base, of means for supporting a wheel assembly upon said base, means for riveting the spokes of the wheel assembly to the rim member of the wheel assembly, means for gripping the portions of the spokes adjacent to the rim member while the spokes are being riveted, and a reciprocable member provided with means for actuating both said riveting and gripping means in timed relation to each other.

2. In a riveting machine for wire wheels, the combination with a base, of means for supporting a wheel assembly upon said base, a reciprocable member, means carried by said reciprocable member for riveting the spokes of the wheel assembly to the rim member thereof, and means actuated by said reciprocable member for gripping the portions of the spokes adjacent to the rim member while the spokes are being riveted.

3. In a riveting machine for wire wheels, the combination with a support for a wheel assembly, of a member reciprocable toward and away from said support, means for riveting the spokes of the wheel assembly to the rim member thereof, including a riveting punch carried by said reciprocable member, and means for gripping the portions of the spokes adjacent to the rim member while the spokes are being riveted, including a die shoe upon said support and actuated by said reciprocable member toward and away from the spokes of the wheel assembly and spoke gripping members carried by said die shoe.

4. In a riveting machine for wire wheels, the combination with a base and means upon said base for supporting a wheel assembly, of a member reciprocable toward and away from said base, a punch carried by said reciprocable member for riveting successive spokes of the wheel assembly to the rim member thereof, a die shoe reciprocably mounted upon said base and actuated by the reciprocable member aforesaid toward and away from the spokes, spoke gripping members carried by said die shoe, and means operated by said reciprocable member for actuating said spoke gripping members in timed relation to the die shoe.

5. In a riveting machine for wire wheels, the combination with a base, of means upon said base for supporting a wheel assembly, a holder reciprocable toward and away from said base, a riveting punch carried by said holder for riveting successive spokes of the wheel assembly to the rim member thereof, a reciprocable die shoe carried by said base and movable toward and away from the spokes, cooperating swinging spoke gripping members carried by said die shoe, means for reciprocating said die shoe, including a cam carried by said holder, and means for swinging said spoke gripping members, including a second cam carried by said holder.

6. In a riveting machine for wire wheels, the combination with a base, of means upon said base for supporting a wheel assembly, a holder reciprocable toward and away from said base, a riveting punch carried by said holder for riveting successive spokes of the wheel assembly to the rim member thereof, a reciprocable die shoe carried by said base and movable toward and away from the spokes, cooperating swinging spoke gripping members carried by said die shoe, means for reciprocating said die shoe, including a cam carried by said holder, means for swinging said spoke gripping members, including a second cam carried by said holder, and means for indexing said supporting means, including a member carried by said holder.

7. In a riveting machine for wire wheels, the combination with a base, of means upon said base for supporting a wheel assembly, a holder reciprocable toward and away from said base, a riveting punch carried by said holder for riveting successive spokes of the wheel assembly to the rim member thereof, a reciprocable die shoe carried by said base and movable toward and away from the spokes, cooperating swinging spoke gripping members carried by said die shoe, means for reciprocating said die shoe, including a cam carried by said holder, means for swinging said spoke gripping members, including a second cam carried by said holder, and means for indexing said supporting means including an index disk and a ratchet disk connected to said supporting means, a reciprocable plunger engageable with said index disk, a dog engageable with said ratchet disk, and means carried by said holder for reciprocating said plunger and bringing said dog into engagement with said ratchet disk.

8. In a riveting machine for wire wheels, the combination with a base, of means upon said base for supporting a wheel assembly, a holder reciprocable toward and away from said base, a riveting punch carried by said holder for riveting successive spokes of the wheel assembly to the rim member thereof, swinging spoke gripping members having at their front ends portions for clamping a spoke and having portions at their rear ends spaced from each other, cams carried by said holder and movable upon reciprocation thereof between the rear end portions of said spoke gripping members for spreading the same apart, said cams being relatively angularly movable to compensate for the swinging of said spoke gripping members and maintain an extended contact therewith.

9. In a riveting machine for wire wheels, the combination with a base, of means upon said base for supporting a wheel assembly, a holder reciprocable toward and away from said base, a riveting punch carried by said holder for riveting successive spokes of the wheel assembly to the rim member thereof, means operable by said holder to grip the spokes while being riveted, and means for indexing said supporting means including a pair of members connected thereto, and means operable upon movement of said holder to advance one of said members to its approximate position and to subsequently exactly position the other of said members.

In testimony whereof I affix my signature.

WILLIAM N. BOOTH.